United States Patent Office 2,936,124
Patented May 10, 1960

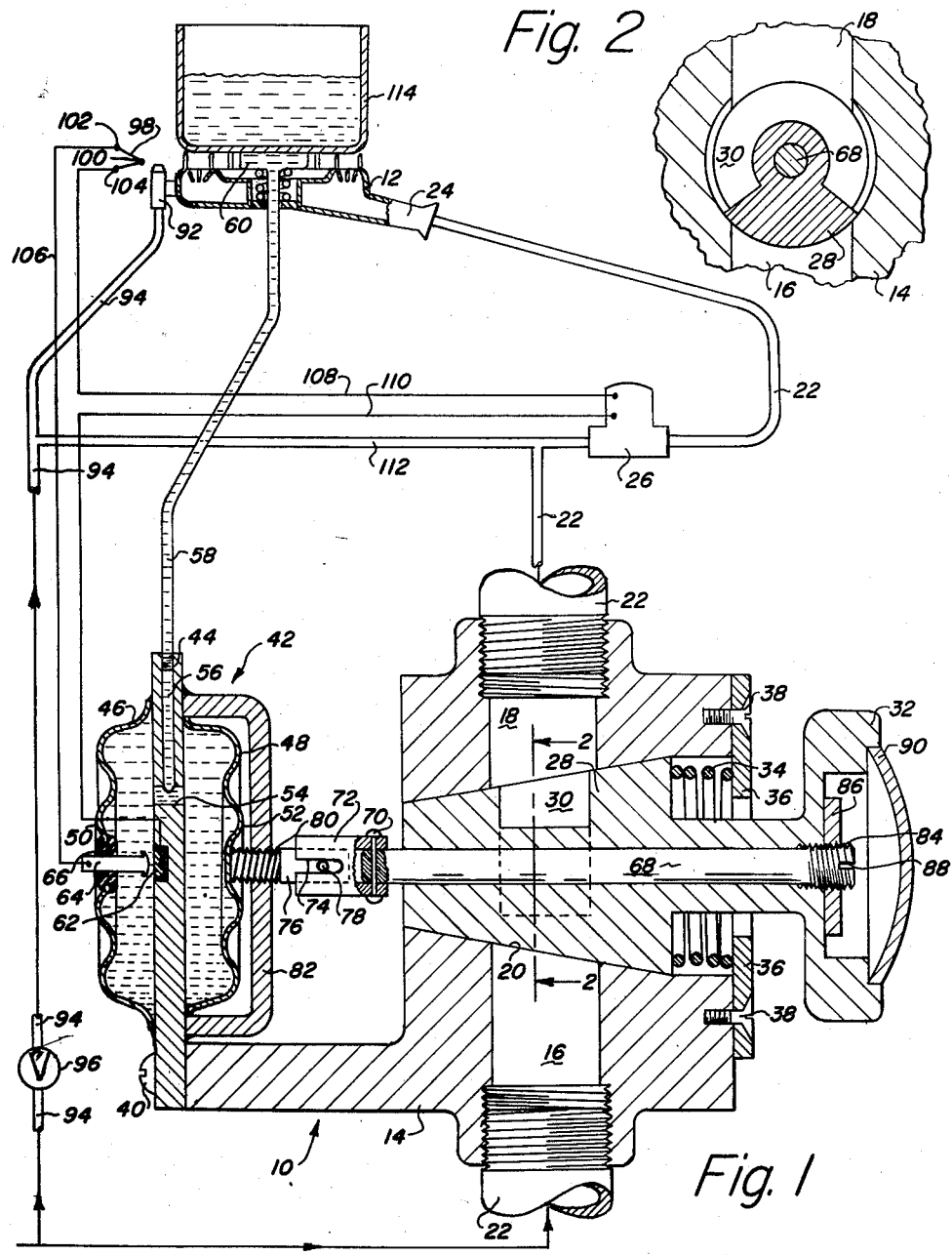

2,936,124

BURNER CONTROL APPARATUS

Adolph J. Hilgert, Milwaukee, Wis., assignor to Baso Inc., Milwaukee, Wis., a corporation of Wisconsin Application April 29, 1957, Serial No. 655,619

13 Claims. (Cl. 236—21)

This invention relates to control apparatus and more particularly to apparatus enabling both manual and condition responsive control of fluid flow.

More specifically, the present invention teaches the construction and use of a single control instrumentality having both a manually operable "on-off" valve and a condition responsive control device which can be adjusted to any desired control point within a predetermined range thereof.

Further, this invention teaches, in the above control instrumentality, a single operating handle for actuation of the "on-off" valve between flow-permitting and flow-preventing positions, as desired, and for selectively adjusting the control point condition of the condition responsive device while the "on-off" valve is in "on" position. This apparatus is particularly desirable for use in fluid fuel burning appliances such as household gas ranges to enable a person to turn the range "on" and "off," as desired, and to adjust the temperature to be thermostatically maintained, all of such operations being effected by appropriate manipulation of a single operating handle.

It is therefore an object of this invention to provide an adjustable condition responsive control device which can be rendered responsive to any control point condition within a predetermined range thereof.

Another object is to provide means for condition responsive devices as characterized above whereby the extreme conditions of the range may be varied as desired.

Another object of this invention is to provide a condition responsive device as characterized above wherein a substantially incompressible fluid is employed for sensing the presence and absence of the predetermined condition.

Another object is the provision of a condition responsive control device as characterized above comprising enclosure means for such fluid, said enclosure means comprising a pair of movable wall portions one of which carries a movable control member for movement between various controlling positions with respect to a stationary control member and the other of which is movable, as desired, for adjustment of the relative positions of said control members and hence the control point condition of the condition responsive device.

Another object is to utilize a condition responsive control device as characterized above for controlling the temperature of a container and its contents heated by a main fluid fuel burner; there being a bulb-like enclosure in contact with said container having an expansible and contractible fluid fill for controlling the relative position of the movable and stationary contacts and hence the fuel flow to the main fluid fuel burner.

Another object is to provide control apparatus as characterized above including a thermoelectrically responsive control valve for controlling fuel flow to the main fluid fuel burner and a flame responsive thermoelectric generator in circuit therewith and with the contacts of the condition responsive control device whereby fuel flow to said main fuel burner is responsive to the temperature of the container and the presence and absence of a flame at said thermoelectric generator.

Another object of this invention is to combine the aforedescribed condition responsive control device with a manually operable "on-off" valve also controlling fuel flow to the main fuel burner and to utilize the manual actuating means by which the valve is turned "on" and "off" to permit adjustment of the condition responsive control device, while the manual valve is in its "on" position, for selection of the control point condition.

Another object is to provide control apparatus as characterized above wherein the main fluid fuel burner is ignited by a pilot or ignition burner, the latter also being used to heat the thermoelectric generator which energizes the electroresponsive valve in accordance with operation of the condition responsive control device, whereby the apparatus affords thermostatic control and safety shut-off control of fuel flow to the main burner.

Another object is to provide apparatus as characterized above wherein the pilot or ignition burner is afforded a small standby flame independently of both the manual "on-off" valve and the condition responsive control device, there being means affording additional fuel flow to said pilot burner upon operation of said manual valve to its "on" position to provide sufficient heating of the hot junction of the generator for subsequent operation of the electroresponsive valve to its flow-permitting position and to provide a flame capable of igniting the main fuel burner upon such operation of said electroresponsive valve.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Figure 1 is more or less a diagrammatic showing of the entire fuel burning and control apparatus, the condition responsive control device and the manual "on-off" valve being shown in section, and Figure 2 is a sectional view of the plug valve taken substantially along line 2—2 of Figure 1.

Like reference characters indicate corresponding parts throughout the several views of the drawings.

Referring to Figure 1 of the drawings, it shows control apparatus 10 controlling fluid fuel flow to a main fuel burner 12. Control apparatus 10 comprises a valve body 14 formed with internally threaded inlet and outlet chambers 16 and 18 respectively, and a conically shaped valve seat 20 therebetween. Contiguous sections of a main fuel supply conduit 22 are threadedly fixed to valve body 14 within inlet and outlet chambers 16 and 18 to afford fuel flow from a source of fuel supply (not shown) to main burner 12 through a mixing chamber 24, there being an electroresponsive flow control device 26 interposed in said conduit 22 downstream of control apparatus 10 for a purpose to be hereinafter explained in detail.

Positioned within valve seat 20 is a frusto-conically shaped plug valve 28 formed with a flow control port 30 which extends about the axis of plug valve 28 for approximately 270°, as best shown in Figure 2. Plug valve 28 is further formed with an actuating handle 32 positioned externally of valve body 14 for manual manipulation by an operator. A compression spring 34 and back-up plate 36 fastened to valve body 14 by means of screws 38 cooperate to retain plug valve 28 firmly seated in valve seat 20.

Forming a part of control apparatus 10 and fixed to valve body 14 by means of a screw 40 is a condition responsive control device 42. Device 42 comprises a stationary member 44 and enclosure members 46 and 48 soldered or welded along their peripheral edges to opposite sides of stationary member 44. Each of the enclosure members 46 and 48 is formed with movable portions 50 and 52, respectively, shown in Figure 1 as consisting of a plurality of concentric corrugations. Stationary member 44 is formed with a through-opening 54 which affords communication between the chambers enclosed by members 46 and 48 and an aperture 56 having communication with through-opening 54. A conduit or tube 58 is fixed to stationary member 44 within aperture 56, and is provided with a temperature sensing bulb-like end portion 60 positioned in close proximity to main burner 12 as shown in Figure 1. The space defined by members 46 and 48, opening 54, aperture 56, tube 58 and bulb-like end portion 60 of tube 58 contains a substantially incompressible temperature responsive expansible and contractible fluid fill which is electrically non-conductive in character and which is not transformed from one physical phase to another within the particular range of temperatures encountered. By way of example, one fluid having these characteristics is tetrachlorodiphenyl and another fluid also exhibiting these characteristics is a mixture of diphenyl and diphenyl oxide.

Condition responsive device 42 further comprises a stationary contact 62 insulatedly positioned within an opening formed in stationary member 44, and a movable contact 64 insulatedly positioned by means of a grommet 66 within the movable portion 50 of enclosure member 46.

Means for adjusting the control point temperature or the responsive condition of device 42 by operation of plug valve operating handle 32 is provided as shown in Figure 1. Such adjusting means comprises an actuating stem 68 positioned coaxially within plug valve 28. Fixed to one end of actuating stem 68 as by means of a rivet 70 is a sleeve member 72 formed with a pair of cutouts which are elongated longitudinally of sleeve 72 as shown at 74. An adjusting screw 76 is telescopically positioned within sleeve member 72, there being a pin 78 fixed to screw 76 for engagement with the cutouts in sleeve member 72 to prevent substantial relative rotational movement between adjusting screw 76 and sleeve member 72. Adjusting screw 76 is formed with external fastening threads 80 which engage complementally formed threads within an opening in a stationary bracket 82 which is fastened, in any desired manner, to stationary member 44 as shown in Figure 1. In order to effect retractive movement of screw 76 as operating handle 32 is rotated in clockwise direction, I prefer to make fastening threads 80 of the left-hand type.

Actuating stem 68 is formed at its right-hand end, as shown in Figure 1, with external threads 84 which engage suitably formed threads in plug valve 28. A lock-nut 86 also engages the right-hand end of actuating stem 68 and cooperates with operating handle 32 to lock stem 68 in any desired position within plug valve 28. A screw driver slot or kerf 88 is formed in the right-hand end portion of actuating stem 68 to facilitate adjustment thereof. A closure member 90 is removably positioned within operating handle 32 to provide a neat appearance while permitting access to the aforedescribed adjusting means.

Positioned adjacent the main burner 12 for ignition thereof, is an ignition or pilot burner 92 which is supplied fluid fuel from the aforementioned source (not shown) through a standby pilot fuel supply conduit 94 and manually operable valve device 96, as well as through conduits 22 and 112, as will hereinafter be described.

Positioned adjacent ignition burner 92 is a thermoelectric generator or thermocouple having a hot thermojunction 100 to be heated by a flame of ignition burner 92 and a pair of cold thermojunctions 102 and 104. A lead wire 106 affords connection of junction 102 of generator 98 with movable contact 64 of condition responsive control device 42. A lead wire 108 affords connection of junction 104 of generator 98 with one side of electroresponsive flow control device 26; a lead conductor 110 affording connection of the other side of device 26 with stationary contact 62 of control device 42.

A section of fluid fuel supply conduit 112 interconnects main fuel conduit 22 and pilot fuel conduit 94 as shown in Figure 1.

The embodiment of the invention chosen for illustration in the drawings operates as follows:

In order to ignite pilot burner 92, it is merely necessary to manually open valve 96 to permit a small amount of fuel to flow from the source (not shown) through conduit 94 to pilot burner 92. The fluid fuel emitted at burner 92 may be ignited in any desired manner. I prefer to regulate valve device 96 so that the fuel passing therethrough and burning at pilot burner 92 is relatively small, being only large enough so as not to be extinguished under ordinary atmospheric conditions. Such small or standby flame is generally too small to effect sufficient heating of the hot junction 100 of thermoelectric generator 98 for development of an electrical potential across the cold junctions 102 and 104 thereof sufficient for actuation of control device 26.

With operating handle 32 of plug valve 28 positioned as shown in Figure 2, fluid fuel is prevented from flowing through conduit 22, and contact 64 of condition responsive device 42 is held in circuit-interrupting position with respect to stationary contact 62 in spite of the fact that the condition responsive liquid within enclosure members 46 and 48 is at a relatively low temperature at this time.

In order to effect ignition of main burner 12, it is first necessary to rotate operating handle 32 in clockwise direction until flow control port 30, of plug valve 28, effects communication of inlet chamber 16 and outlet chamber 18. Such movement of plug valve 28 permits fluid fuel to flow from the source (not shown) through conduit 22 upstream of valve body 14, inlet chamber 16, flow control port 30, outlet chamber 18, conduit 22 upstream of valve device 26, conduit 112 and a portion of conduit 94 to pilot burner 92 to afford additional fuel supply to the latter to provide a pilot flame which is considerably larger than the aforedescribed standby pilot flame. The larger flame effects sufficient heating of the hot junction 100 of generator 98 to cause an electrical potential to be developed across the cold junctions 102 and 104 of generator 98 sufficient for actuation of control device 26. Also, such flame is large enough to ignite the main burner 12 whenever fluid fuel is supplied thereto.

The aforedescribed clockwise rotation of operating handle 32 which effected fuel flow through flow control port 30 of plug valve 28, also causes adjusting screw 76 to be rotated in a clockwise direction, and hence retracted or moved to the right as viewed in Figure 1, due to the left-hand threads on screw 76 and bracket 82. Such movement of screw 76 is effected by virtue of the engagement between pin 78 in screw 76 and slot 74 formed in sleeve 72, such pin and slot connection permitting translatory movement of adjusting screw 76 without the creation of forces tending to move plug valve 28 from its valve seat 20.

As adjusting screw 76 is retracted, the inherent bias in the movable portion 50 of enclosure member 46 causes a portion of the fluid within the chamber formed by enclosure member 46 to be forced through the opening 54 formed in stationary member 44 and into the chamber formed by enclosure member 48. The amount of liquid thus transferred from one chamber to another and hence the amount of movement of movable portion 50 of enclosure member 46 is determined by the amount of retractive movement of adjusting screw 76 and hence the amount of clockwise rotation of operating handle 32 of plug valve 28. In any event, such movement of movable portion 50 of enclosure member 46 is sufficient to effect engagement of movable contact 64 with stationary contact 62 and hence completion of the energizing circuit for electro-responsive valve device 26. Such circuit comprises lead wire 106, movable contact 64, stationary contact 62, lead wire 110, control device 26, and lead wire 108. Energization of valve device 26 permits fuel to flow to main burner 12 through conduit 22 and mixing chamber 24. The fuel thus emitted at main burner 12 is ignited by the flame at ignition burner 92.

Positioning of a container, as for example that shown at 114, on main burner 12 for the purpose of heating the contents thereof causes such container to contact or rest against the bulb-like end portion 60 of conduit 58. Main burner 12 is so constructed and bulb-like end portion 60 is so positioned with respect thereto that main burner 12 effects direct heating of the container and its contents. However, the expansible and contractible fluid within bulb-like portion 60 is heated and cooled in accordance with temperature variations of the container and its contents. As the temperature of the container and its contents increases as by heating thereof by main burner 12, the liquid within bulb-like end portion 60 of conduit 58 expands thereby creating a corresponding increase in the pressure throughout the temperature responsive fluid. Such increase in pressure tends to move both of the movable portions 50 and 52 of enclosure members 46 and 48 respectively, but since adjusting screw 76 remains in engagement with movable portion 52 to prevent outward movement thereof, such increase in pressure moves only movable portion 50 to the left as shown in Figure 1. Upon sufficient movement of movable portion 50, as determined by the amount of the aforedescribed retraction movement of adjusting screw 76, movable contact 64 is moved to circuit-interrupting position with respect to stationary contact 62. In this manner, electroresponsive flow control device 26 is deenergized and fluid fuel flow to main burner 12 is interrupted. However, pilot burner 92 continues to be supplied with fuel at the higher rate aforementioned, since plug valve 28 is still open.

As the container on main burner 12 thereafter cools, the liquid within bulb-like end portion 60 of the tube 58 contracts and the inherent bias in movable portion 50 is permitted to effect engagement of contacts 64 and 62 for reenergization of electroresponsive control device 26 and hence reignition of main burner 12. In this manner, electroresponsive flow control device 26 is caused to cycle in permitting and preventing fuel flow to main burner 12 to provide a thermostatic function in accordance with the temperature of the container and its contents.

Greater or less rotational movement of operating handle 32 of plug valve 28 within the flow-permitting limits of the latter, effects greater or less retractive movement of screw 76 and hence corresponding distribution of the liquid between the chambers of members 46 and 48 and corresponding adjustment of the temperature necessary at bulb-like end portion 60 of tube 58 to effect separation of contacts 62 and 64. In view of this, I prefer to provide operating handle 32 with a pointer or indicating arrow (not shown) for cooperation with suitable indicia for indicating the relationship between the position of handle 32 and the temperature to be maintained at the aforementioned container and its contents.

Should it be desired to alter the range of possible temperatures, as defined by the extreme flow-permitting positions of plug valve 28, it is merely necessary to remove cover 90, loosen lock-nut 86 and, by means of a screw driver in engagement with kerf 88, rotate actuating stem 68 with respect to plug valve 28. In this manner, the relative positions of contacts 64 and 62 for any given position of operating handle 32 are changed so that the container and its contents will be maintained at a different temperature whenever handle 32 is so positioned. The aforedescribed pointer or indicating arrow and cooperating indicia must be changed accordingly.

Should it be desired to shut down the entire fluid fuel burning apparatus, it is merely necessary to close valve device 96 and plug valve 28. In this manner fuel flow to both the pilot burner 92 and the main burner 12 is instantly interrupted. Also, such movement of plug valve 28 causes removable contact 64 to be positioned in circuit-interrupting position with respect to stationary contact 62.

It is thus seen that the present invention affords a novel condition responsive control device and a novel combination of such device and a manually operable plug valve and electroresponsive device as hereinbefore explained in detail.

Although I have shown and described certain specific embodiments of my invention, I am fully aware that many modifications thereof are possible. My invention, therefore, is not to be restricted except insofar as is necessitated by the prior art and by the spirit of the appended claims.

What is claimed is:

1. Control apparatus for fluid fuel burning means including a main burner and an ignition burner therefor, fuel supply means for said burners including an electroresponsive control device energizable to permit fuel flow to said main burner and deenergizable to prevent fuel flow thereto, and a circuit including a thermoelectric generator responsive to a flame at said ignition burner for energization of said electroresponsive control device, said control apparatus comprising, a manually operable flow-control device associated with said fuel supply means operable between a first position permitting fuel flow to said main burner and affording a large operating flame at said ignition burner and a second position preventing fuel flow to said main burner and permitting only a small standby flame at said ignition burner, an adjustable condition responsive device controlling said circuit in accordance with variations in a given conditon, and manual actuating means operatively associated with said manually operated control device and said condition responsive device to simultaneously effect operation of said control device from its second to its first position and adjustment of said circuit controlling device to vary as desired the variation in said given condition necessary to effect energization and deenergization of said electroresponsive control device.

2. Control apparatus for fluid fuel burning means including a main burner and an ignition burner therefor, fuel supply means for said burners including an electroresponsive control device energizable to permit fuel flow to said main burner and deenergizable to prevent fuel flow thereto, and a circuit including a thermoelectric generator responsive to a flame at said ignition burner for energization of said electroresponsive control device, said control apparatus comprising, a manually operable flow-control device associated with said fuel supply means operable between a first position permitting fuel flow to said main burner and affording a large operating flame at said ignition burner and a second position preventing fuel flow to said main burner and permitting only a small standby flame at said ignition burner, an adjustable temperature responsive device comprising enclosure means having a pair of movable portions, a substantially incompressible fluent fill for said enclosure means, cooperating contacts comprising a stationary contact and a movable contact fixed relative to one of said movable portions for controlling said circuit in accordance with temperature variations at said fill, and manual actuating means operatively associated with said manually operated control device and the other movable portion of the enclosure means of said temperature responsive device to simultaneously effect operation of said control device from its second to its first position and adjustment of the relative position of said contacts by variation in the distribution of said fill within said enclosure means to vary as desired the variation in temperature necessary to effect energization and deenergization of said electroresponsive control device.

3. In combination, a burner, a plug valve controlling fuel flow to said burner and having a plug rotatable between closed and a plurality of open positions, an electroresponsive valve also controlling fuel flow to said burner, a temperature responsive control device in circuit with said electroresponsive valve for controlling the latter comprising, enclosure means having a pair of movable portions, means adjustably fixing one of said movable portions, a substantially incompressible electrically substantially non-conductive temperature responsive expansible and contractible fluid fill for said enclosure, control means within said enclosure means comprising a stationary contact and a movable contact connected to the other of said movable portions for movement therewith from circuit-interrupting to circuit-making position with respect to said stationary contact upon response of said fill to a given change in temperature, and means affording an operative connection between said valve plug and said adjustably fixing means for altering the fixed position of said one movable portion and thereby altering the position of said other movable portion and said movable contact to thereby alter accordingly the temperature necessary to effect disposition of said movable contact in said circuit-making position.

4. Control means for apparatus having a main burner and an ignition burner therefor, comprising manually operable valve means operable to permit or prevent fuel flow to said main burner, electro responsive cycling valve means downstream of said manual valve means energizable to permit and deenergizable to prevent fuel flow to said main burner, heat responsive electrical energy source means in circuit with said electroresponsive valve means for energizing the latter responsive to the generation of heat by burning of fuel at said ignition burner, a temperature responsive circuit controlling device comprising expansible and contractible enclosure means having a substantially incompressible electrically substantially non-conductive temperature responsive expansible and contractible fluid fill, cooperating contacts within said enclosure means relatively movable to circuit-interrupting and circuit-making positions by expansion and contraction of said enclosure means, said contacts being connected in circuit with said source means and said electroresponsive valve means to cycle the latter in response to variations in temperature when a predetermined flame exists at said ignition burner, and means for adjusting the control point of said circuit controlling device by movement of said manual valve means, wherefore fuel flow to said main burner can be terminated by response of said circuit controlling means to a selected temperature and by outage of the ignition burner flame as well as by closure of said manual valve means.

5. Control apparatus for fluid fuel burning means having a main burner and an ignition burner therefor, comprising fuel supply means for said burners, manually operable flow control means operatively associated with said fuel supply means and having one position in which fuel flow therethrough to said main burner is prevented and fuel flow to said ignition burner only sufficient for a small standby flame is permitted, said manually operable means having another position in which fuel flow therethrough to said main burner is permitted and fuel flow to said ignition burner sufficient for a larger operating flame is permitted, interlock means operatively associated with said main and ignition burners and including a cycling on-off flow control device for preventing fuel flow to said main burner except when said larger operating flame is present at said ignition burner, condition responsive means operatively associated with said flow control device for cycling the latter to permit or prevent the flow of fuel to said main burner in accordance with variations in a given condition while said larger operating flame is present at said ignition burner, and means for adjusting the control point of said condition responsive means by movement of said manually operable means.

6. Control apparatus for fluid fuel burning means having a main burner and an ignition burner therefor, comprising fuel supply means for said burners, manually operable flow control means operatively associated with said fuel supply means and having one position in which fuel flow therethrough to said main burner is prevented and fuel flow to said ignition burner only sufficient for a small standby flame is permitted, said manually operable means having another position in which fuel flow therethrough to said main burner is permitted and fuel flow to said ignition burner sufficient for a larger operating flame is permitted, interlock means comprising a thermoelectric generator subject to the heat of said ignition burner and a cycling electroresponsive on-off flow control device in circuit with said generator for preventing fuel flow to said main burner except when said larger operating flame is present at said ignition burner, condition responsive circuit controlling means in circuit with said generator and flow control device for cycling the latter to permit or prevent the flow of fuel to said main burner in accordance with variations in a given condition while said larger operating flame is present at said ignition burner, and means for adjusting the control point of said condition responsive circuit controlling means by movement of said manually operable means.

7. Control apparatus for fluid fuel burning means having a main burner and an ignition burner therefor, comprising fuel supply means for said burners affording a continuous supply of fuel to said ignition burner at a first rate sufficient to afford a small standby flame, manually operable flow control means operatively associated with said fuel supply means and with said burner and through which all fuel flow to said main burner must pass, said manually operable means having one position preventing fuel flow therethrough to said burners and having another position permitting fuel flow therethrough to said main burner and also permitting fuel flow therethrough to said ignition burner to augment the supply of fuel to the latter and thereby afford fuel flow thereto at a second rate sufficient for a larger operating flame of a size to safely ignite said main burner, interlock means operatively associated with said main and ignition burners and including a cycling on-off flow control device for preventing fuel flow to said main burner except when said larger operating flame is present at said ignition burner, condition responsive means operatively associated with said flow control device for cycling the latter to permit or prevent the flow of fuel to said main burner in accordance with variations in a given condition while said larger operating flame is present at said ignition burner and means for adjusting the control point of said condition responsive means by movement of said manually operable means.

8. Control apparatus for fluid fuel burning means having a main burner and an ignition burner therefor, comprising fuel supply means for said burners affording a continuous supply of fuel to said ignition burner at a first rate sufficient to afford a small standby flame, manually operable flow control means operatively associated with said fuel supply means and with said burner and through which all fuel flow to said main burner must pass, said manually operable means having one position preventing fuel flow therethrough to said burners and having another position permitting fuel flow therethrough to said main burner and also permitting fuel flow therethrough to said ignition burner to augment the supply of fuel to the latter and thereby afford fuel flow thereto at a second rate sufficient for a larger operating flame of a size to safely ignite said main burner, interlock means comprising a thermoelectric generator subject to the heat of said ignition burner and a cycling electroresponsive on-off flow control device in circuit with said generator for preventing fuel flow to said main burner except when said larger operating flame is present at said ignition burner, condition responsive circuit controlling means in circuit with said generator and flow control device for cycling the latter to permit or prevent the flow of fuel to said main burner in accordance with variations in a given condition while said larger operating flame is present at said ignition burner and means for adjusting the control point of said condition responsive circuit controlling means by movement of said manually operable means.

9. Control means for apparatus having a main burner and an ignition burner therefor, comprising manually operable valve means operable to permit or prevent fuel flow to said main burner, electroresponsive cycling valve means downstream of said manual valve means energizable to permit and deenergizable to prevent fuel flow to said main burner, heat responsive electrical energy source means in circuit with said electroresponsive valve means for energizing the latter responsive to generation of heat by burning of fuel at said ignition burner, a temperature responsive circuit controlling device connected in circuit with said source means and with said electroresponsive valve means to cycle the latter in response to variations in temperature when a predetermined flame exists at said ignition burner, and means for adjusting the control point of said circuit controlling device by movement of said manual valve means, wherefore fuel flow to said main burner can be terminated by response of said circuit controlling means to a selected temperature and by outage of the ignition burner flame as well as by closure of said manual valve means.

10. Control apparatus for fluid fuel burning means having a main burner and an ignition burner therefor, comprising fuel supply means for said burners, manually operable flow control means operatively associated with said fuel supply means and having one position in which fuel flow therethrough to said main burner is prevented and fuel flow to said ignition burner only sufficient for a small standby flame is permitted, said manually operable means having another position in which fuel flow therethrough to said main burner is permitted and fuel flow to said ignition burner sufficient for a larger operating flame is permitted, interlock means operatively associated with said main and ignition burners and including a cycling on-off flow control device for preventing fuel flow to said main burner except when said larger operating flame is present at said ignition burner, and condition responsive means operatively associated with said flow control device for cycling the latter to permit or prevent the flow of fuel to said main burner in accordance with variations in a given condition while said larger operating flame is present at said ignition burner.

11. Control apparatus for fluid fuel burning means having a main burner and an ignition burner therefor, comprising fuel supply means for said burners, manually operable flow control means operatively associated with said fuel supply means and having one position in which fuel flow therethrough to said main burner is prevented and fuel flow to said ignition burner only sufficient for a small standby flame is permitted, said manually operable means having another position in which fuel flow therethrough to said main burner is permitted and fuel flow to said ignition burner sufficient for a larger operating flame is permitted, interlock means comprising a thermoelectric generator subject to the heat of said ignition burner and a cycling electroresponsive on-off flow control device in circuit with said generator for preventing fuel flow to said main burner except when said larger operating flame is present at said ignition burner, and condition responsive circuit controlling means in circuit with said generator and with said flow control device for cycling the latter to permit or prevent the flow of fuel to said main burner in accordance with the variations in a given condition while said larger operating flame is present at said ignition burner.

12. Control apparatus for fluid fuel burning means having a main burner and an ignition burner therefor, comprising fuel supply means for said burners affording a continuous supply of fuel to said ignition burner at a first rate sufficient to afford a small standby flame, manually operable flow control means operatively associated with said fuel supply means and with said burner and through which all fuel flow to said main burner must pass, said manually operable means having one position preventing fuel flow therethrough to said burners and having another position permitting fuel therethrough to said main burner and also permitting fuel flow therethrough to said ignition burner to augment the supply of fuel to the latter and thereby afford fuel flow thereto at a second rate sufficient for a larger operating flame of a size safely to ignite said main burner, interlock means operatively associated with said main and ignition burners and including a cycling on-off flow control device for preventing fuel flow to said main burner except when said larger operating flame is present at said ignition burner, and condition responsive means operatively associated with said flow control device for cycling the latter to permit or prevent the flow of fuel to said main burner in accordance with variations in a given condition while said larger operating flame is present at said ignition burner.

13. Control apparatus for fluid fuel burning means having a main burner and an ignition burner therefor, comprising fuel supply means for said burners affording a continuous supply of fuel to said ignition burner at a first rate sufficient to afford a small standby flame, manually operable flow control means operatively associated with said fuel supply means and with said burner and through which all fuel flow to said main burner must pass, said manually operable means having one position preventing fuel flow therethrough to said burners and having another position permitting fuel flow therethrough to said main burners and having another position permitting fuel flow therethrough to said main burner and also permitting fuel flow therethrough to said ignition burner to augment the supply of fuel to the latter and to thereby afford fuel flow thereto at a second rate sufficient for a larger operating flame of a size safely to ignite said main burner, interlock means comprising a thermoelectric generator subject to the heat of said ignition burner and a cycling electroresponsive on-off flow control device in circuit with said generator for preventing fuel flow to said main burner except when said larger operating flame is present at said ignition burner, and condition responsive circuit controlling means in circuit with said generator and flow control device for cycling the latter to permit or prevent the flow of fuel to said main burner in accordance with variations in a given condition while said larger operating flame is present at said ignition burner.

References Cited in the file of this patent

UNITED STATES PATENTS

| | | |
|---|---|---|
| 1,874,909 | Conklin | Aug. 30, 1932 |
| 2,694,525 | Winet | Nov. 16, 1954 |
| 2,717,123 | Hilgert | Sept. 6, 1955 |
| 2,719,202 | Wolff | Sept. 27, 1955 |

FOREIGN PATENTS

| | | |
|---|---|---|
| 833,361 | France | July 18, 1938 |